US009094118B2

(12) United States Patent
Yu

(10) Patent No.: US 9,094,118 B2
(45) Date of Patent: Jul. 28, 2015

(54) SYSTEM FOR PROVIDING WDM-BASED WIRELESS OPTICAL TRANSPORT NETWORK AND METHOD FOR TRANSMITTING WIRELESS OPTICAL SIGNAL USING THE SAME

(71) Applicant: Electronics and Telecommunications Research Institute, Daejeon (KR)

(72) Inventor: Jea Hoon Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 412 days.

(21) Appl. No.: 13/712,146

(22) Filed: Dec. 12, 2012

(65) Prior Publication Data

US 2013/0163991 A1 Jun. 27, 2013

(30) Foreign Application Priority Data

Dec. 27, 2011 (KR) ........................ 10-2011-0143572

(51) Int. Cl.
*H04B 10/00* (2013.01)
*H04B 10/11* (2013.01)
*H04B 10/112* (2013.01)
*H04B 10/12* (2006.01)

(52) U.S. Cl.
CPC ............ *H04B 10/11* (2013.01); *H04B 10/1129* (2013.01)

(58) Field of Classification Search
CPC .. H04B 10/11; H04B 10/112; H04B 10/1123; H04B 10/1125; H04B 10/1127; H04B 10/1129; H04B 10/275; H04B 10/2755; H04J 14/0201

USPC .................................................. 398/118–131
See application file for complete search history.

(56) References Cited

U.S. PATENT DOCUMENTS

| 2002/0114044 A1* | 8/2002 | Chiou et al. | 359/172 |
|---|---|---|---|
| 2002/0187809 A1* | 12/2002 | Mani et al. | 455/561 |
| 2006/0083512 A1* | 4/2006 | Wake | 398/59 |
| 2008/0037988 A1* | 2/2008 | Bullock | 398/59 |
| 2014/0153928 A1* | 6/2014 | Yu et al. | 398/115 |

FOREIGN PATENT DOCUMENTS

| KR | 10-0553421 | 2/2006 |
|---|---|---|
| KR | 20-0452065 | 1/2011 |

* cited by examiner

*Primary Examiner* — Daniel Dobson
(74) *Attorney, Agent, or Firm* — Nelson Mullins Riley & Scarborough LLP; Anthony A. Laurentano, Esq.

(57) ABSTRACT

Disclosed are a system for providing a WDM-based wireless optical transport network and a method for transmitting a wireless optical signal using the same. The system for providing a WDM-based wireless optical transport network, includes: a central office terminal (COT) for bilaterally transmitting wireless optical signals of different unique wavelengths; and a plurality of remote terminals (RTs) connected to the COT in a ring, for dropping a wireless optical signal having a corresponding unique wavelength from the wireless optical signals transmitted from the COT, for adding a corresponding optical transmission signal to wireless optical signals of the remaining unique wavelengths except for the corresponding unique wavelength of the dropped wireless optical signal, and for bilaterally transporting the wireless optical signals to which the corresponding optical transmission signal is added.

19 Claims, 6 Drawing Sheets

SYSTEM FOR PROVIDING WDM-BASED WIRELESS OPTICAL TRANSPORT NETWORK AND METHOD FOR TRANSMITTING WIRELESS OPTICAL SIGNAL USING THE SAME

CROSS-REFERENCE TO RELATED APPLICATIONS

This application claims priority to and the benefit of Korean Patent Application No. 10-2011-0143572 filed in the Korean Intellectual Property Office on Dec. 27, 2011, the entire contents of which are incorporated herein by reference.

TECHNICAL FIELD

The present invention relates to a wireless optical transport network, and more particularly, to a system for providing a wavelength division multiplexing (WDM)-based wireless optical transport network in which a central office terminal (COT) and a plurality of remote terminals (RTs) are connected to each other in a ring, allots unique wavelengths to a plurality of RTs in multi-wavelength WDM to drop or add only a wireless optical signal of a corresponding wavelength from or to the RTs, and bilaterally transmits wireless optical signals of remaining wavelengths, and a method for transmitting a wireless optical signal using the same.

BACKGROUND ART

A wireless optical transport network technology has been utilized and commercialized to an area or disaster relief restoring means difficult to set an optical line. The related art has used a scheme for transmitting 1 Gbps class single wavelength optical signals through a free space by a point-to-point network configuration in a remote location spaced by several hundred meters.

However, the scheme has no method capable of transporting a wireless optical signal through a substitute path when obstacle occurs in a wireless environment.

When the RT is distant from the COT, because separate wireless optical repeaters are installed in the middle of the RT and the COT, it becomes difficult to construct an economic network.

SUMMARY OF THE INVENTION

The present invention has been made in an effort to provide a system for providing a WDM-based wireless optical transport network and a method for transmitting wireless optical signal using the same in which a COT and a plurality of RTs are connected to each other in a ring, allots unique wavelengths to a plurality of RTs in multi-wavelength WDM to drop or add only a wireless optical signal of corresponding wavelength from or to the RTs, and transmitting wireless optical signals of remaining wavelengths.

The present invention also has been made in an effort to provide a system for providing a WDM-based wireless optical transport network that may multiplex wireless optical transceivers of a COT and a plurality of RTS to bilaterally transmit a wireless optical signal, and a method for transmitting a wireless optical signal using the same.

However, an object of the present invention is not limited to the above mentioned matters, and other non-mentioned objects will become apparent to those skilled in the art based on the following explanation.

An exemplary embodiment of the present invention provides a system for providing a wavelength division multiplexing (WDM)-based wireless optical transport network, the system including: a central office terminal (COT) for bilaterally transmitting wireless optical signals of different unique wavelengths; and a plurality of remote terminals (RTs) connected to the COT in a ring and configured to drop a wireless optical signal of corresponding unique wavelength from the wireless optical signals transmitted from the COT, add a corresponding optical transmission signal to wireless optical signals of remaining wavelengths except for the corresponding unique wavelength of the dropped wireless optical signal, and bilaterally transport the wireless optical signals to which the corresponding optical transmission signal is added.

The number of different unique wavelengths may be set to be equal or greater than the number of the RTs connected to the COT in the ring.

The COT may multiplex the wireless optical signals having the different unique wavelengths, and transmit the wireless optical multiplexed signals to an RT in a forward direction and an RT in a reverse direction connected to each other in a ring.

The COT may include: a first transmitting unit for transmitting the wireless optical signal to an RT in a forward direction; a second transmitting unit for transmitting the wireless optical signal to an RT in a reverse direction; a first receiving unit for receiving the wireless optical signal from the RT in the forward direction; and a second receiving unit configured to receive the wireless optical signal from the RT in the reverse direction.

The system may further include a beam monitoring control unit for switching between a receiving path from the first receiving unit and a receiving path from the second receiving unit when strength of the wireless optical signal received from the first receiving unit or the second receiving unit is less than or equal to a reference value.

The RT may include: a first receiving unit for receiving wireless optical signals from a COT or an RT in a reverse direction, and dropping a wireless optical signal of corresponding unique wavelength from the received wireless optical signals; a second receiving unit for receiving wireless optical signals from a COT or an RT in a forward direction, and dropping a wireless optical signal of a corresponding unique wavelength from the received wireless optical signals; a first transmitting unit for adding the wireless optical signal of corresponding unique wavelength to the wireless optical signals of remaining unique wavelengths received from the first receiving unit or the second receiving unit, and transmitting the added wireless optical signals to the COT or the RT in the reverse or forward direction; and a second transmitting unit for adding the wireless optical signal of the corresponding unique wavelength to the wireless optical signals of the remaining unique wavelength received from the first receiving unit or the second receiving unit, and transmitting the added wireless optical signals to the COT or the RT in the reverse or forward direction.

The system may further include: a beam monitoring control unit for switching between a receiving path from the first receiving unit and a receiving path from the second receiving unit when strength of the wireless optical signal received from the first receiving unit or the second receiving unit is less than or equal to a reference value.

Each of the first receiving unit and the second receiving unit may include a splitter for splitting the wireless optical signals of the remaining wavelengths except for the wireless optical dropped signal of the corresponding unique wavelength from the received wireless optical signals into the first transmitting unit and the second transmitting unit.

Another exemplary embodiment of the present invention provides a system for providing a wireless optical transport network including a central office terminal (COT) and a plurality of remote terminals (RTs), the system including: a first receiving unit for receiving first wireless optical signals from a COT or an RT in a reverse direction, and for dropping a wireless optical signal of corresponding unique wavelength from the first received wireless optical signals; a second receiving unit for receiving second wireless optical signals from a COT or an RT in a forward direction, and for dropping a wireless optical signal of corresponding unique wavelength from the second received wireless optical signals; a first transmitting unit for adding the wireless optical signal of the corresponding unique wavelength to wireless optical signals of remaining unique wavelengths received by the first receiving unit or the second receiving unit, and transmitting the wireless optical added signals to the COT or the RT in the reverse direction or the forward direction; and a second transmitting unit for adding the wireless optical signal of the corresponding unique wavelength to wireless optical signals of remaining unique wavelengths received from the first receiving unit or the second receiving unit, and transmitting the wireless optical added signals to the COT or the RT in the reverse direction or the forward direction.

The COT may transmit the wireless optical signals to the RT in the forward direction and the RT in the reverse direction connected to the COT in a ring.

The system may further include a beam monitoring control unit for switching between a receiving path from the first receiving unit and a receiving path from the second receiving unit when strength of the optical signal received from the first receiving unit or the second receiving unit is less than or equal to a reference value.

Each of the first receiving unit and the second receiving unit may include a splitter for splitting the wireless optical signals of the remaining unique wavelengths except for the wireless optical dropped signal of the corresponding unique wavelength from the received wireless optical signals into the first transmitting unit and the second transmitting unit.

Yet another exemplary embodiment of the present invention provides a method for transporting a wireless optical signal using a system for providing a wavelength division multiplexing (WDM)-based wireless optical transport network, the method including: bilaterally transmitting wireless optical signals having different unique wavelengths by a central office terminal (COT); dropping a wireless optical signal of a corresponding unique wavelength from the wireless optical signals transmitted from the COT by a remote terminal (RT) in a reverse or forward direction connected to the COT in a ring; and adding a corresponding optical transmission signal to wireless optical signals of remaining wavelengths except for the dropped wireless optical signal of the corresponding unique wavelength, and for bilaterally transporting the wireless optical signals to which the corresponding optical transmission signal is added by the RT in the reverse or forward direction.

The number of different unique wavelengths may be set to be equal or greater than the number of RTs connected to the COT in the ring.

The bilaterally transmitting of wireless optical signals by the COT may include: multiplexing the wireless optical signals having different unique wavelengths, and transmitting the wireless optical multiplexed signals to an RT in a forward direction and an RT in a reverse direction in a ring.

The dropping of the wireless optical signal of corresponding unique wavelength may include: dropping the wireless optical signal of the corresponding unique wavelength from the wireless optical signals transmitted from the COT by the RT in the reverse or forward direction; converting the wireless optical dropped signal of the corresponding unique wavelength into an electric signal, and processing the electric signal; and splitting the wireless optical signals of the remaining wavelengths except for the wireless optical dropped signal of the corresponding unique wavelength into a first transmitting unit or a second transmitting unit in the RT in the reverse or forward direction.

Still another exemplary embodiment of the present invention provides a method for transporting a wireless optical signal by a remote terminal (RT) connected to a central office terminal (COT) in a ring, the method including: when wireless optical signals are received, dropping a wireless optical signal of corresponding unique wavelength from the received wireless optical signals; converting the dropped wireless optical signal of the corresponding unique wavelength into an electric signal, and processing the electric signal; and adding a corresponding transmission optical signal to the wireless optical signals of the remaining wavelengths except for the dropped wireless optical signal having the corresponding unique wavelength and bilaterally transmitting the added wireless optical signals.

The COT may transmit wireless optical signals of different unique wavelengths to an RT in a forward direction and an RT in a reverse direction connected to the COT in the ring, respectively.

The dropping of the wireless optical signal of corresponding unique wavelength may include: dropping the wireless optical signal of the corresponding unique wavelength from the wireless optical signals transmitted from the COT by the RT in the reverse or forward direction; and splitting the wireless optical signals of the remaining wavelengths except for the wireless optical dropped signal of the corresponding unique wavelength into a first transmitting unit or a second transmitting unit in the RT in the reverse or forward direction.

According to exemplary embodiments of the present invention, it is possible to connect a COT to a plurality of remote terminals (RTs) in a ring, allot unique wavelengths to the plurality of RTs in multi-wavelength WDM to drop or add only a wireless optical signal of corresponding wavelength from or to the RTs, and bilaterally transport wireless optical signals of remaining wavelengths, thereby switching wireless optical transport paths without loss of data when obstacle occurs in a wireless section.

The present invention may secure existence and reliability which are requirements of a transport network.

The present invention may drop or add only a wireless optical signal of unique wavelength in optical wavelength transmitted along a ring in an RT to make possible high speed and simplicity of the transport network.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
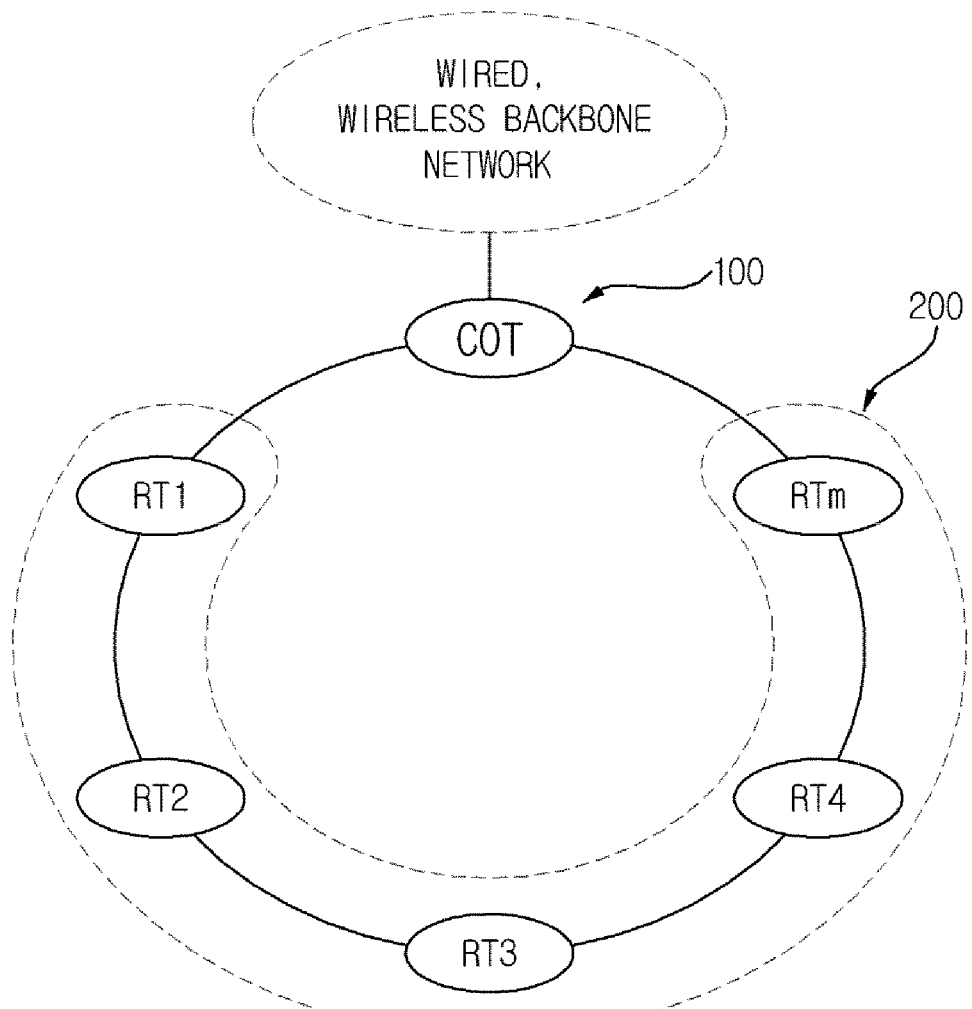
FIG. 1 is a diagram illustrating a system for providing a wireless optical transport network according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, a system for providing a WDM-based wireless optical transport network and a method for transmitting a wireless optical signal using the same according to exemplary embodiments of the present invention will be described in detail with reference to the accompanying drawings, FIGS. 1 to 6. First of all, parts necessary to understand an operation and functions according to the present invention will be described in detail. In describing the present invention, well-known functions or constructions will not be described in detail since they may unnecessarily obscure the understanding of the present invention. We should note that in giving reference numerals to elements of each drawing, like reference numerals refer to like elements even though like elements are shown in different drawings.

The present invention suggests a new method for connecting a COT to a plurality of RTs in a ring, allotting unique wavelengths to a plurality of RTs in multi-wavelength WDM to drop or add only a wireless optical signal of corresponding wavelength from or to the RTs to transmit a wireless optical signal, and transporting wireless optical signals of remaining wavelengths.

FIG. 1 is a diagram illustrating a system for providing a wireless optical transport network according to an exemplary embodiment of the present invention.

As shown in FIG. 1, the system for providing a wireless optical transport network according to an exemplary embodiment of the present invention includes a COT 100 and a plurality of RTs 200, which may be configured to be connected in a ring.

The COT 100 may operatively cooperate with system equipment, for example, a router or the like to transmit a signal transmitted from the system equipment to the plurality of RTs 200 or to transmit a signal transmitted from the RT to the system equipment.

The COT 100 may bilaterally transmit at least one wireless optical signal $\lambda_1 \sim \lambda_m$ to a plurality of RTs, namely, RT1, RT2, ..., RTm. That is, the COT 100 may transmit the wireless optical signals $\lambda_1 \sim \lambda_m$ in a forward direction, or an RT1 direction and in a reverse direction or an RTm direction.

The RT 200 may transmit a signal provided from a subscriber to the COT 100 or transmit a signal provided from the COT 100 to the subscriber as a device accessing a user or the subscriber.

The RT 200 may drop at least one corresponding optical signal from the wireless optical signals $\lambda_1 \sim \lambda_m$, add at least one optical transmission signal to the wireless optical signals, and transmit a wireless optical signal to which the optical transmission signal is added to the COT 100 and a plurality of other RTs 200. Here, the present invention may allot unique wavelength, particularly, at least one unique wavelength to each of the plurality of RTs 200.

Figure 2:
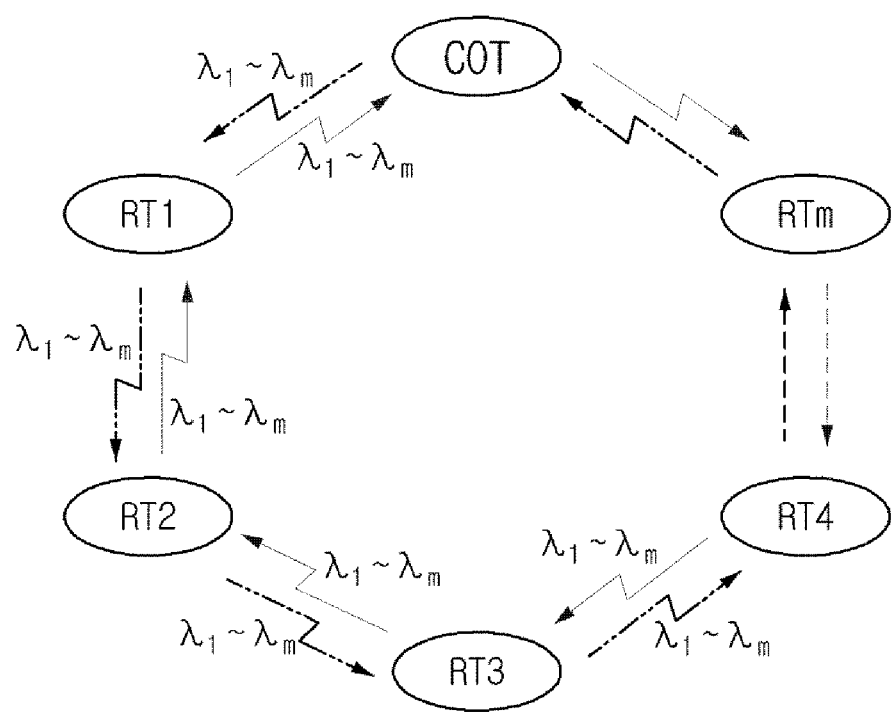
FIG. 2 is a diagram illustrating a transmitting principle of a wireless optical signal according to an exemplary embodiment of the present invention.

FIG. 2 is a diagram illustrating a transmitting principle of a wireless optical signal according to an exemplary embodiment of the present invention.

As shown in FIG. 2, when the COT 100 according to an exemplary embodiment of the present invention bilaterally transmits wireless optical signals $\lambda_1 \sim \lambda_m$ in an RT1 direction and in an RTm direction, an RT1 drops a corresponding optical signal $\lambda_1$ from the wireless optical signal $\lambda_1 \sim \lambda_m$, adds an optical transmission signal $\lambda_1$ to wireless optical signals $\lambda_2 \sim \lambda_m$, and bilaterally transmits the wireless optical signals $\lambda_1 \sim \lambda_m$ to the COT and an RT2.

Next, the RT2 drops a corresponding optical signal $\lambda_2$ from the wireless optical signals $\lambda_1 \sim \lambda_m$, adds an optical transmission signal $\lambda_2$ to wireless optical signals $\lambda_1, \lambda_3 \sim \lambda_m$, and bilaterally transmits the wireless optical signals $\lambda_1 \sim \lambda_m$ to the RT1 and an RT3.

Operations for dropping or adding the corresponding optical signals are equally performed in RT1, RT2, ..., RTm and then the COT receives a wireless optical signal to which optical transmission signals are added.

In this case, each of the RT1, RT2, ..., RTm according to an exemplary embodiment of the present invention drops or adds only one optical signal. However, the present invention is not limited thereto. The RT1, RT2, ..., RTm may drop or add two or more optical signals.

Because each of the COT and the plurality of RTs bilaterally transmits the wireless optical signal, even an obstacle occurs in a section, loss of packet data is prevented. For example, even the wireless optical signals transmitted from the COT are transmitted to the RT1 but are not transmitted to the RT2 because an obstacle occurs in the RT1, the COT may transmit the wireless optical signals through the RT3.

Figure 3:
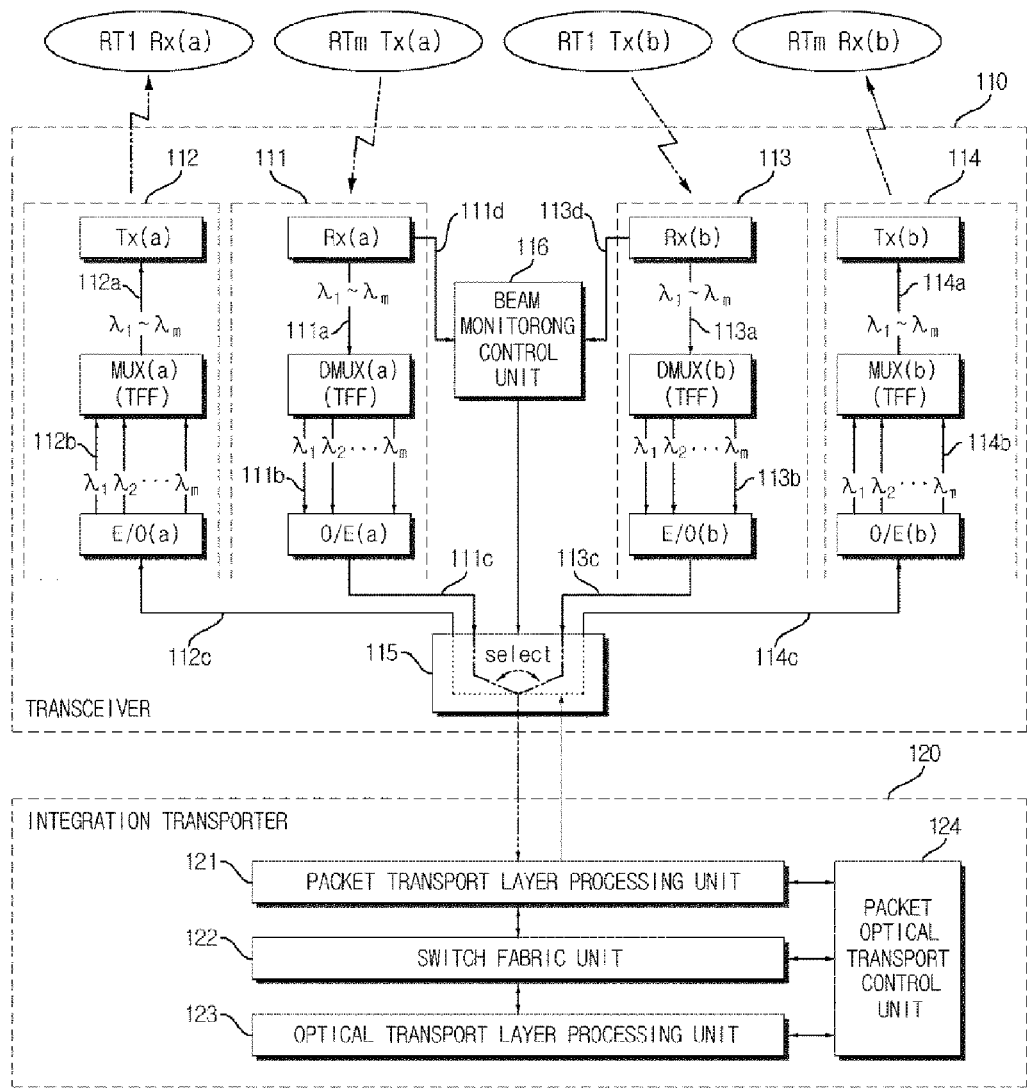
FIG. 3 is a diagram illustrating a detailed configuration of a COT shown in FIG. 1.

FIG. 3 is a diagram illustrating a detailed configuration of the COT 100 shown in FIG. 1.

As shown in FIG. 3, the COT 100 according to the present invention may include a transceiver 110 and an integration transporter 120. Here, the transceiver 110 is multiplexed for bilateral transmission. The transceiver 110 may include a first receiving unit 111, a first transmitting unit 112, a second receiving unit 113, a second transmitting unit 114, a selecting unit 115, and a beam monitoring control unit 116.

The first receiving unit 111 may receive a wireless optical signal transmitted from a Tx(a) of an RTm. That is, an Rx(a) of the first receiving unit 111 receives the wireless optical signal, a DMUX(a) demultiplexes the received optical signal to generate a plurality of optical demultiplexed signals, and an O/E(a) converts the plurality of optically demultiplexed signals into electric signals, respectively.

The first transmitting unit 112 may transmit a wireless optical signal to an Rx(a) of an RT1. That is, an E/O(a) of the transmitting unit 112 converts electric signals of different wavelengths into optical signals, respectively, an MUX(a) of the transmitting unit 112 multiplexes the plurality of optical converted signals to generate a wireless optical multiplexed signal, and a Tx(a) of the transmitting unit 112 transmits the wireless optical multiplexed signal.

The second receiving unit 113 may receive a wireless optical signal transmitted from a Tx(b) of the RT1. That is, an Rx(b) of the second receiving unit 113 receives the wireless optical signal, a DMUX(b) of the second receiving unit 113 demultiplexes the received wireless optical signal to generate a plurality of optical demultiplexed signals, and an E/O(b) of the second receiving unit 113 converts the plurality of optical demultiplexed signals into electric signals, respectively.

The second transmitting unit 114 may transmit the wireless optical signal to an Rx(b) of an RTm. That is, an O/E(b) of the second transmitting unit 114 converts electric signals of different wavelengths into optical signals, respectively, an MUX (b) of the second transmitting unit 114 multiplexes a plurality of optical converted signals, and a Tx(b) of the second transmitting unit 114 transmits a wireless optical multiplexed signal.

The selecting unit 115 may determine whether to select a path 111c from the Rx(a) of the first receiving unit 111 or a path 113c from the Rx(b) of the second receiving unit 113 according to an operation policy of a wireless optical network.

The beam monitoring controller 116 may monitor wireless optical signals of an Rx(a) in the first receiving unit 111 and an Rx(b) in the second receiving unit 113. For example, when strength of an optical signal 111d of the Rx(a) in the first receiving unit 111 is less than or equal to a reference value, the beam monitoring control unit 116 transmits a control signal to the selecting unit 115 such that the selecting unit 115 switches a receiving path 111c of the Rx(a) in the first receiving unit 111 to a receiving path 113c of an Rx(b) in the second receiving unit 113.

In the same manner, when strength of an optical signal 113d of an Rx(b) in the second receiving unit 113 is less than or equal to the reference value, the beam monitoring control unit 116 transmits a control signal to the selecting unit 115 such that the selecting unit 115 switches a receiving path 113c of an Rx(b) in the second receiving unit 113 to a receiving path 111c of an Rx(a) in the first receiving unit 111.

The integration transporter 120 includes a packet transport layer processing unit 121, a switch fabric unit 122, an optical transport layer processing unit 123, and a packet optical transport control unit 124.

The packet transport layer processing unit 121 may perform a receiving packet matching function (Multi Protocol Label Switching—Transport Protocol; MPLS-TP), and a packet forwarding function according to MPLS-TP path setting and a given path from all RTs through the selecting unit 115. Here, there is an MPLS-TP as an example of a packet transport network in the exemplary embodiment of the present invention. However, the present invention is not limited thereto. Various schemes may be used.

The packet transport layer processing unit 121 may transmit a transmission MPLS-TP packet from all RTs to the Tx(a) and the Tx(b) through the selecting unit 115.

The switch fabric unit 122 may perform a switch function.

The optical transport layer processing unit 123 may perform an OTN matching function and a wavelength switching function.

The packet optical transport control unit 124 may separately or integrally set or release a packet path and an optical path in the COT through control of the packet transport layer processing unit 212, the switch fabric unit 122, and the optical transport layer processing unit 123. The packet optical transport control unit 124 may perform a path integration control protocol signaling function based on GMPLS.

Figure 4:
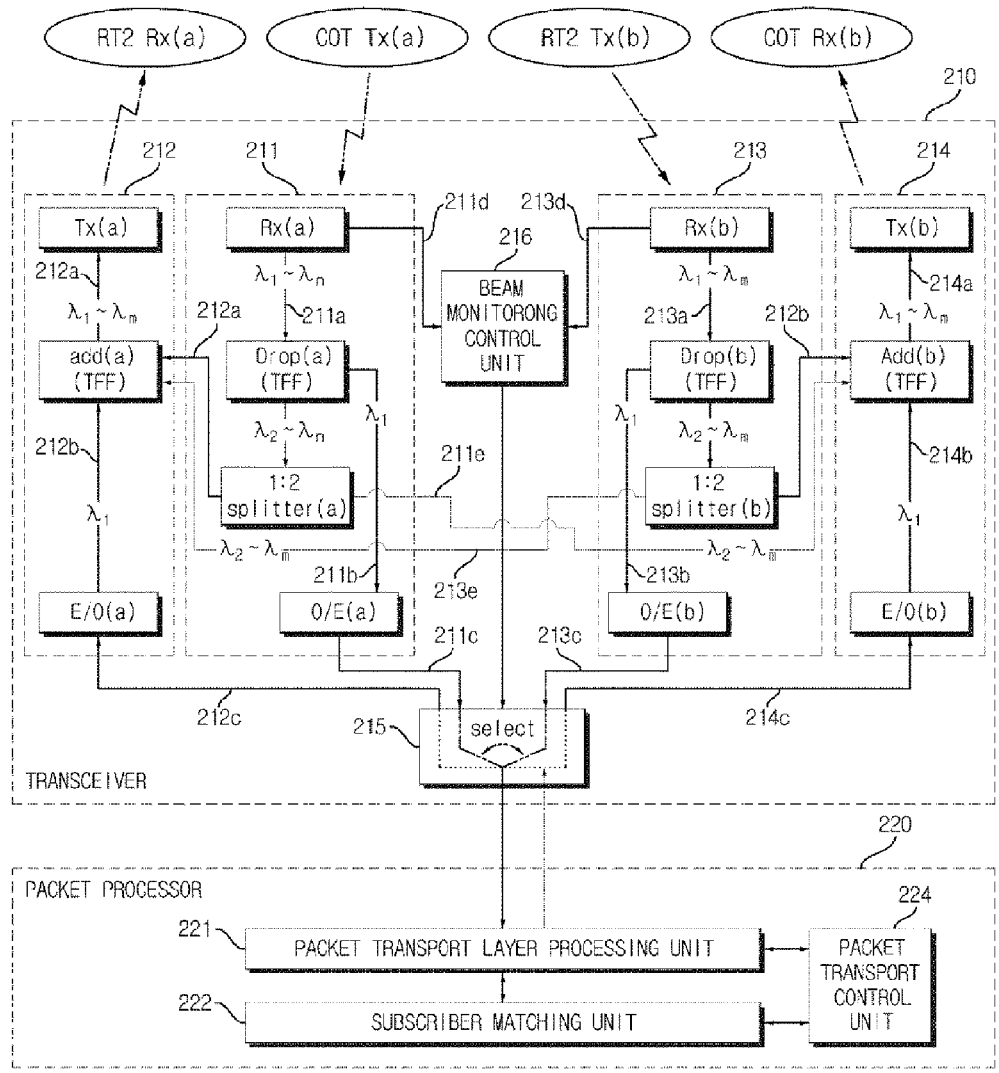
FIG. 4 is a diagram illustrating a detailed configuration of an RT shown in FIG. 1.

FIG. 4 is a diagram illustrating a detailed configuration of an RT 200 shown in FIG. 1.

As shown in FIG. 4, the RT 200 according to an exemplary embodiment of the present invention may include a transceiver 210 and a packet processor 220. Here, the transceiver 210 is duplexed for bilateral transmission. The transceiver 210 may include a first transmitting unit 212, a first receiving unit 211, a second transmitting unit 214, a second receiving unit 213, a selecting unit 215, and a beam monitoring control unit 216.

Operation principles in all RTs in the wireless optical transport network configured as illustrated in FIG. 1 are identical with each other and an operation principle in an RT1 will be described.

The first receiving unit 211 may receive a wireless optical signal transmitted from a Tx(a) of a COT. That is, an Rx(a) of the first receiving unit 211 receives wireless optical signals $\lambda_1 \sim \lambda_m$, a Drop(a) of the first receiving unit 211 drops a corresponding optical signal $\lambda_1$ from the received wireless optical signals $\lambda_1 \sim \lambda_m$, and an O/E(b) of the first receiving unit 211 converts the optical dropped signal $\lambda_1$ into an electric signal.

In this case, a 1:2 splitter(a) of the first receiving unit 211 may transmit remaining optical signals $\lambda_2 \sim \lambda_m$ except for the optical dropped signal $\lambda_1$ to an Add(a) of the first transmitting unit 212 and an Add(b) of the second transmitting unit 214, respectively.

The Add(a) of the first transmitting unit 212 may add an optical transmission signal $\lambda_1$ to the remaining optical signals $\lambda_2 \sim \lambda_m$ and transmit the remaining optical signals $\lambda_2 \sim \lambda_m$ to which the optical transmission signal $\lambda_1$ is added to an Rx(a) of an RT2 through a Tx(a). The Add(b) of the second transmitting unit 214 may add an optical transmission signal $\lambda_1$ to the remaining optical signals $\lambda_2 \sim \lambda_m$ and transmit the remaining optical signals $\lambda_2 \sim \lambda_m$ to which the optical transmission signal $\lambda_1$ is added to an Rx(b) of the COT through a Tx(b).

The second receiving unit 213 may receive the wireless optical signals transmitted from a Tx(b) of the RT2. That is, an Rx(b) of the second receiving unit 213 receives the wireless optical signals $\lambda_1 \sim \lambda_m$, a Drop(b) of the second receiving unit 213 drops a corresponding optical signal $\lambda_1$ from the received wireless optical signals $\lambda_1 \sim \lambda_m$, and an O/E(b) of the second receiving unit 213 converts the wireless optical dropped signal $\lambda_1$ into an electric signal.

In this case, a 1:2 splitter(b) of the second receiving unit 213 may transmit remaining optical signals $\lambda_2 \sim \lambda_m$ except for the wireless optical dropped signal $\lambda_1$ to an Add(b) of the second transmitting unit 214 and an Add(a) of the first transmitting unit 214, respectively.

The Add(b) of the second transmitting unit 214 may add an optical transmission signal $\lambda_1$ to the optical signals $\lambda_2 \sim \lambda_m$ and transmit the wireless optical signal $\lambda_2 \sim \lambda_m$ to which the optical transmission signal $\lambda_1$ is added to an Rx(b) of the COT through a Tx(b). The Add(a) of the first transmitting unit 211 may add an optical transmission signal $\lambda_1$ to the wireless optical signal $\lambda_2 \sim \lambda_m$ and transmit the wireless optical signal $\lambda_2 \sim \lambda_m$ to which the optical transmission signal $\lambda_1$ is added to an Rx(a) of the RT2 through a Tx(a).

The selecting unit 215 may determine whether to select a path 211c from an Rx(a) of the first receiving unit 211 or a path 113c from an Rx(b) of the second receiving unit 213 according to an operation policy of the wireless optical network.

The beam monitoring control unit 216 may monitor wireless optical signals of an Rx(a) in the first receiving unit 211 and an Rx(b) in the second receiving unit 213. For example, when strength of an optical signal 211d of the Rx(a) in the first receiving unit 211 is less than or equal to a reference value, the beam monitoring control unit 216 transmits a control signal to the selecting unit 215 such that the selecting unit 215 switches a receiving path 211c of the Rx(a) in the first receiving unit 211 to a receiving path 213c of an Rx(b) in the second receiving unit 213.

In the same manner, when strength of an optical signal 213d of an Rx(b) in the second receiving unit 213 is less than or equal to the reference value, the beam monitoring control unit 216 transmits a control signal to the selecting unit 215 such that the selecting unit 215 switches a receiving path 213c of an Rx(b) in the second receiving unit 213 to a receiving path 211c of an Rx(a) in the first receiving unit 211.

The packet processor 220 may include a packet transport layer processing unit 221, a subscriber matching unit 222, and a packet transport control unit 224.

The packet transport layer processing unit 221 may receive packets from all RT subscribers through the selecting unit 215 and transmit a packet from the RT subscriber to both of Tx(a) and Tx(b) through the selecting unit.

The packet transport layer processing unit 221 may include an MPLS-TS packet engine and may provide a direct MPLS-TP transport service between a subscriber in an RT and an external subscriber of the RT, and may perform a packet switch function between subscribers in the RT.

The subscriber matching unit 222 may have a subscriber Ethernet port in the RT.

The packet transport control unit 224 may set or release a packet path in the RT and MPLS-TP and perform Ethernet protocol signaling function under the control of the packet transport layer processing unit 221.

Figure 5:
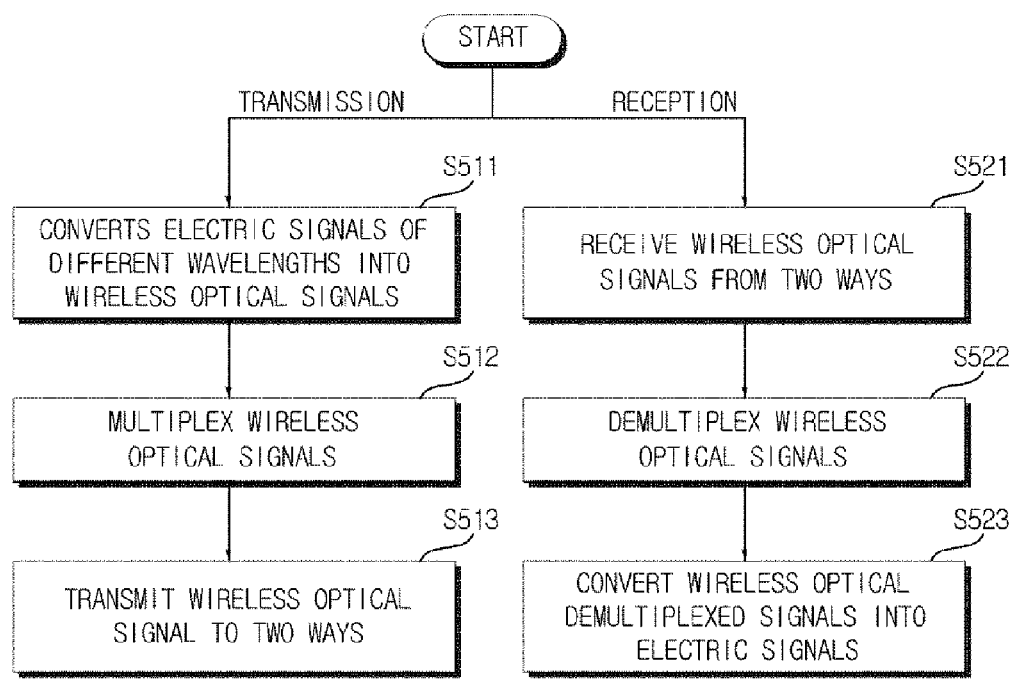
FIG. 5 is a flowchart illustrating a method for transporting a wireless optical signal by the COT according to an exemplary embodiment of the present invention.

FIG. 5 is a flowchart illustrating a method for transmitting a wireless optical signal by the COT according to an exemplary embodiment of the present invention.

As shown in FIG. 5, when a COT according to an exemplary embodiment of the present invention transmits a wireless optical signal, it may converts electric signals of different wavelengths into wireless optical signals (S511).

Here, the number of different wavelengths may be equal to or greater than the number of RTs connected to the COT in a ring. One unique wavelength may be allotted for each RT. However, the present invention is not limited thereto. At least two unique wavelengths may be allotted for each RT.

Next, the COT may multiplex a plurality of wireless optical converted signals (S512).

Subsequently, the COT may transmit a wireless optical multiplexed signal to two ways, namely, an RT in a forward direction and an RT in a reverse direction (S513).

When receiving a wireless optical signal, the COT may receive wireless optical signals from two ways, namely, from the RT in a forward direction and the RT in a reverse direction, respectively (S521). Here, the wireless optical signals from the RT in a forward direction and the RT in a reverse direction may be identical with each other.

Next, the COT may demultiplex the wireless optical signals received from the RT in a forward direction and the RT in a reverse direction, respectively (S522), convert a plurality of wireless optical demultiplexed signals into electric signals, and process the electric signal, respectively (S523).

Figure 6:
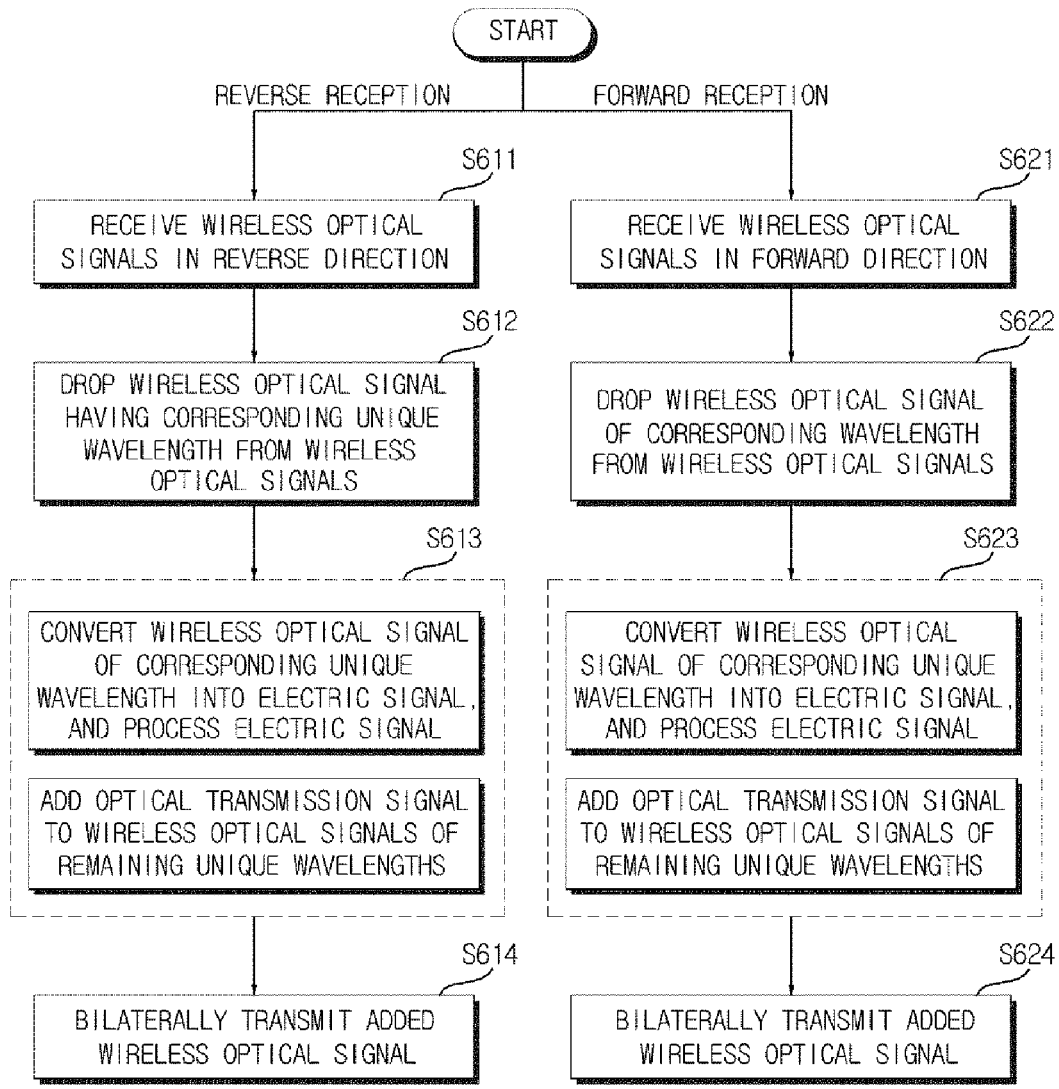
FIG. 6 is a flowchart illustrating a method for transmitting a wireless optical signal by the RT according to an exemplary embodiment of the present invention.

FIG. 6 is a flowchart illustrating a method for transporting a wireless optical signal by the RT according to an exemplary embodiment of the present invention.

As shown in FIG. 6, an RT according to an exemplary embodiment of the present invention may receive wireless optical signals transmitted from a COT or an RT in a reverse direction (S611). The RT drops a wireless optical signal of corresponding unique wavelength from the received wireless optical signals (S612), converts the wireless optical dropped signal into an electric signal, and processes the electric signal.

Here, the forward direction may refer to a clockwise direction and the reverse direction may refer to a counterclockwise direction.

Next, the RT may add an optical transmission signal to wireless optical signals of remaining wavelengths except for the corresponding unique wavelength of the dropped wireless optical signal (S613), and transmit the wireless optical signals to which the optical transmission signal is added to a COT in a reverse direction and an RT in a forward direction or an RT in a reverse direction and an RT in the forward direction (S614). That is, when receiving a signal from the COT in the reverse direction, the RT transmits the signal to the COT in the reverse direction and the RT in the forward direction. When receiving the wireless optical signal from the RT in the reverse direction, the RT transmits the signal to the RT in the reverse direction and the RT in the forward direction.

In the same manner, the RT may receive wireless optical signals transmitted from an RT or a COT in a forward direction (S621). The RT drops a wireless optical signal of corresponding wavelength from the received wireless optical signals (S622), converts the wireless optical dropped signal into an electric signal, and processes the electric signal.

Next, the RT adds an optical transmission signal to wireless optical signals of the remaining wavelengths except for the corresponding unique wavelength of the dropped wireless optical signal (S623), and transmit the wireless optical signals to which the optical transmission signal is added to a COT in a reverse direction and an RT in a forward direction or an RT in a reverse direction and the RT in the forward direction (S624). That is, when receiving a wireless optical signal from the RT in the forward direction, the RT transmits the wireless optical signal to the COT in the reverse direction and the RT in the forward direction. When receiving the signal from the COT in the forward direction, the RT transmits the wireless optical signal to the RT in the reverse direction and the COT in the forward direction.

As described above, a system for providing a WDM-based wireless optical transport network and a method for transporting a wireless optical signal using the same according to the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for providing a wavelength division multiplexing (WDM)-based wireless optical transport network, the system comprising:

a central office terminal (COT) for bilaterally transmitting wireless optical signals having different unique wavelengths; and a plurality of remote terminals (RTs) connected to the COT in a ring, for dropping a wireless optical signal of a corresponding unique wavelength from the wireless optical signals transmitted from the COT, for adding a corresponding optical transmission signal to wireless optical signals of remaining wavelengths except for the corresponding unique wavelength of the dropped wireless optical signal, and for bilaterally transporting the wireless optical signals to which the corresponding optical transmission signal is added.

2. The system of claim 1, wherein the number of different unique wavelengths is set to be equal or greater than the number of RTs connected to the COT in the ring.

3. The system of claim 1, wherein the COT multiplexes the wireless optical signals having different unique wavelengths, and transmits the wireless optical multiplexed signals to an RT in a forward direction and an RT in a reverse direction connected to each other in a ring.

4. The system of claim 1, wherein the COT includes:
a first transmitting unit for transmitting the wireless optical signal to an RT in a forward direction;
a second transmitting unit for transmitting the wireless optical signal to an RT in a reverse direction;
a first receiving unit for receiving the wireless optical signal from the RT in the forward direction; and
a second receiving unit for receiving the wireless optical signal from the RT in the reverse direction.

5. The system of claim 4, further comprising:
a beam monitoring control unit for switching between a receiving path from the first receiving unit and a receiving path from the second receiving unit when strength of the optical signal received from the first receiving unit or the second receiving unit is less than or equal to a reference value.

6. The system of claim 1, wherein the RT includes:
a first receiving unit for receiving wireless optical signals from a COT or an RT in a reverse direction, and dropping a wireless optical signal of corresponding unique wavelength from the received wireless optical signals;
a second receiving unit for receiving wireless optical signals from a COT or an RT in a forward direction, and dropping a wireless optical signal of corresponding unique wavelength from the received wireless optical signals;
a first transmitting unit for adding the wireless optical signal of a corresponding unique wavelength to the wireless optical signals of the remaining unique wavelengths received from the first receiving unit and the second receiving unit, and transmitting the added wireless optical signals to the COT or the RT in the reverse or forward direction; and
a second transmitting unit for adding the wireless optical signal having the corresponding unique wavelength to the wireless optical signals of the remaining unique wavelength received from the first receiving unit and the second receiving unit, and transmitting the added wireless optical signals to the COT or the RT in the reverse or forward direction.

7. The system of claim 6, further comprising:
a beam monitoring control unit for switching between a receiving path from the first receiving unit and a receiving path from the second receiving unit when strength of the wireless optical signal received from the first receiving unit or the second receiving unit is less than or equal to a reference value.

8. The system of claim 6, wherein each of the first receiving unit and the second receiving unit includes a splitter for splitting the wireless optical signals of the remaining unique wavelengths except for the wireless optical dropped signal having the corresponding unique wavelength from the received wireless optical signals into the first transmitting unit and the second transmitting unit.

9. A system for providing a WDM-based wireless optical transport network including a central office terminal (COT) and a plurality of remote terminals (RTs), the system comprising:
a first receiving unit for receiving first wireless optical signals from a COT or an RT in a reverse direction, and for dropping a wireless optical signal having a corresponding unique wavelength from the first received wireless optical signals;
a second receiving unit for receiving second wireless optical signals from a COT or an RT in a forward direction, and for dropping a wireless optical signal having a corresponding unique wavelength from the second received wireless optical signals;
a first transmitting unit for adding the wireless optical signal of the corresponding unique wavelength to wireless optical signals of the remaining unique wavelengths received from the first receiving unit or the second receiving unit, and for transmitting the wireless optical added signals to the COT or the RT in the reverse direction or the forward direction; and
a second transmitting unit for adding the wireless optical signal of the corresponding unique wavelength to wireless optical signals of the remaining unique wavelengths received from the first receiving unit or the second receiving unit, and for transmitting the wireless optical added signals to the COT or the RT in the reverse direction or the forward direction.

10. The system of claim 9, wherein the COT transmits the wireless optical signals to the RT in the forward direction and the RT in the reverse direction connected to the COT in a ring.

11. The system of claim 9, further comprising:
a beam monitoring control unit for switching between a receiving path from the first receiving unit and a receiving path from the second receiving unit when strength of the wireless optical signal received from the first receiving unit or the second receiving unit is less than or equal to a reference value.

12. The system of claim 9, wherein each of the first receiving unit and the second receiving unit includes a splitter for splitting the wireless optical signals of the remaining unique wavelengths except for the wireless optical dropped signal of the corresponding unique wavelength from the received wireless optical signals into the first transmitting unit and the second transmitting unit.

13. A method for transmitting a wireless optical signal using a system for providing a wavelength division multiplexing (WDM)-based wireless optical transport network, the method comprising:
bilaterally transmitting wireless optical signals having different unique wavelengths by a central office terminal (COT);
dropping a wireless optical signal having corresponding unique wavelength from the wireless optical signals transmitted from the COT by a remote terminal (RT) in a reverse or forward direction connected to the COT in a ring; and adding a corresponding optical transmission signal to wireless optical signals of the remaining unique wavelengths except for the dropped wireless optical signal having the corresponding unique wavelength, and for bilaterally transporting the wireless optical signals to which the corresponding optical transmission signal is added by the RT in the reverse or forward direction.

14. The method of claim 13, wherein the number of different unique wavelengths is set to be equal or greater than the number of RTs connected to the COT in the ring.

15. The method of claim 13, wherein the bilaterally transmitting of wireless optical signals by the COT includes:
multiplexing the wireless optical signals having different unique wavelengths, and transmitting the wireless optical multiplexed signals to an RT in a forward direction and an RT in a reverse direction connected to each other in a ring.

16. The method of claim 13, wherein the dropping of the wireless optical signal having corresponding unique wavelength includes:
dropping the wireless optical signal having the corresponding unique wavelength from the wireless optical signals transmitted from the COT by the RT in the reverse or forward direction;
converting the wireless optical dropped signal of the corresponding unique wavelength into an electric signal, and processing the electric signal; and
splitting the wireless optical signals of the remaining wavelengths except for the wireless optical dropped signal having the corresponding unique wavelength into a first transmitting unit or a second transmitting unit in the RT in the reverse or forward direction.

17. A method for transmitting a wireless optical signal by a remote terminal (RT) connected to a central office terminal (COT) in a ring, the method comprising:
when wireless optical signals are received, dropping a wireless optical signal having a corresponding unique wavelength from the received wireless optical signals;
converting the dropped wireless optical signal of the corresponding unique wavelength into an electric signal, and processing the electric signal; and
adding a corresponding transmission optical signal to the wireless optical signals of the remaining wavelengths except for the dropped wireless optical signal having the corresponding unique wavelength and bilaterally transmitting the added wireless optical signals.

18. The method of claim 17, wherein the COT transmits wireless optical signals having different unique wavelengths to an RT in a forward direction and an RT in a reverse direction connected to the COT in the ring, respectively.

19. The method of claim 17, wherein the dropping of the wireless optical signal having the corresponding unique wavelength includes:
dropping the wireless optical signal having the corresponding unique wavelength from the wireless optical signals transmitted from the COT by the RT in the reverse or forward direction; and
splitting the wireless optical signals having the remaining wavelengths except for the wireless optical dropped signal having the corresponding unique wavelength into a first transmitting unit or a second transmitting unit in the RT in the reverse or forward direction.

* * * * *